United States Patent
Perry et al.

(10) Patent No.: US 6,292,193 B1
(45) Date of Patent: Sep. 18, 2001

(54) TECHNIQUES FOR ANISOTROPIC TEXTURE MAPPING USING MULTIPLE SPACE-INVARIANT FILTERING OPERATIONS PER PIXEL

(75) Inventors: Ronald Perry, Cambridge, MA (US); Norman P. Jouppi, Palo Alto, CA (US); Joel J. McCormack, Boulder, CO (US); Keith Istvan Farkas, Menlo Park, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/126,567

(22) Filed: Jul. 30, 1998

(51) Int. Cl.[7] .............................. G06T 11/40; G06T 17/00
(52) U.S. Cl. ........................................... 345/430; 345/428
(58) Field of Search ...................................... 345/430, 428

(56) References Cited

U.S. PATENT DOCUMENTS

| | | | |
|---|---|---|---|
| 4,855,934 | 8/1989 | Robinson | 345/430 |
| 5,097,427 | * 3/1992 | Lathrop et al. | 345/430 |
| 5,594,846 | 1/1997 | Donovan | 345/430 |
| 5,651,104 | 7/1997 | Cosman | 345/430 |
| 6,005,582 | * 12/1999 | Gabriel et al. | 345/430 |
| 6,040,837 | * 3/2000 | Wong et al. | 345/430 |
| 6,078,335 | * 6/2000 | Wong et al. | 345/430 |
| 6,097,397 | * 8/2000 | Lee | 345/430 |
| 6,151,029 | * 11/2000 | Shirman et al. | 345/428 |

OTHER PUBLICATIONS

"Elliptical Gaussian Filters", S. Jackson and N. Ahuja, Proceedings of ICPR, 1996, pp. 775–779.*
Akeley et al., "Reality Engine Graphics" Computer Graphics, SIGGRAPH '93 Proceedings, pp 109–116, 1993.
Torborg et al., Talisman: Commodity Realtime 3D Graphics for the PC, Computer Graphics, SIGGRAPH '96 Proceedings, pp 353–364, 1996.
Schilling et al., "Texram: A Smart Memory for Texturing" IEEE Computer Graphics and Applications, pp 32–41, 1996.
Greene et al., "Creating Raster Omnimax Images from Multiple Perspective Views Using the Elliptical Weighted Average Filter", IEEE Computer Graphics and Applications, vol. 6, No. 6, pp 21–27, 1986.
Heckbert et al., "Survey of Texture Mapping", IEEE Computer Graphics and Applications, vol. 6, No. 11, pp 56–67, 1986.
Williams et al., "Pyramidal Parametrics", Computer Graphics, (SIGRAPH '83 Proceedings, pp 1–11, 1983.
Heckbert et al., "Fundamentals of Texture Mapping and Image Warping" Masters Thesis, Dept. of EECS, U. of California at Berkeley, Technical Report No. UCB/CSD 89/516, pp 1–86, 1989.

* cited by examiner

Primary Examiner—Jeffery Brier
Assistant Examiner—Ryan Yang
(74) Attorney, Agent, or Firm—Leah Sherry; Loren McRoss; Oppenheimer, Wolff & Donnelly

(57) ABSTRACT

A computer graphics system maps textures to displayed anti-aliased images with surfaces defined at oblique angles to the viewer. A circular pixel filter is projected onto a texture map to define an elliptical footprint in that texture map. The elliptical footprint has a major axis. Sample points are determined on a line in the footprint that closely approximates the major axis. These sample points are mapped to levels of detail and locations within a mip-map. Using a space-invariant filter, a texture value is computed for each sample point using data from one or more texture maps within the mip-map. These texture values for the sample points are post-filtered using a Gaussian filter function and summed to produce a final texture value. Blending the final texture with other characteristics of the pixel a produces the pixel data that are displayed on a display screen.

35 Claims, 12 Drawing Sheets

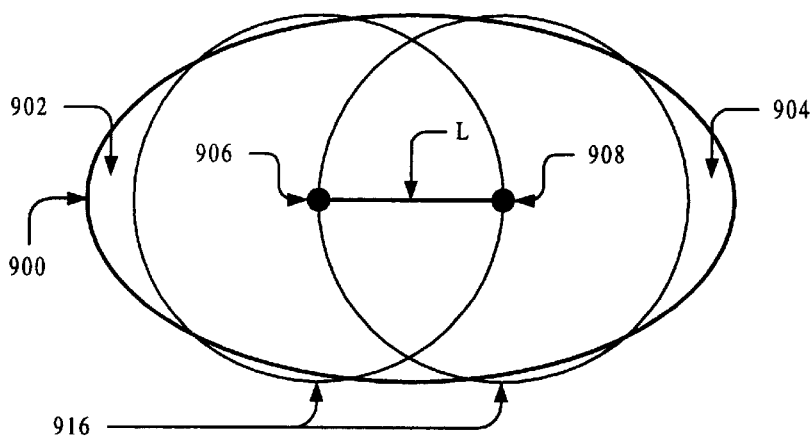

majorRadius = 1.749
minorRadius = 1
realNumberOfProbes =2.498
numberOfProbes = 2 probes overlap sufficiently, but
ellipse ends are not sampled

Figure 9A

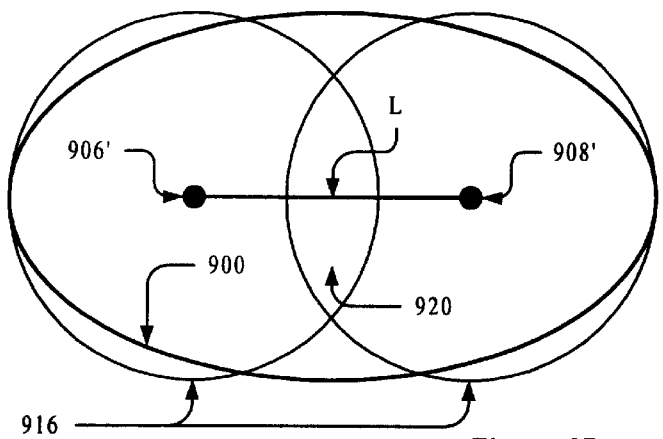

majorRadius = 1.749
minorRadius = 1
realNumberOfProbes =2.498
numberOfProbes = 2 probes don't overlap
sufficiently, ellipse center
(most important area) is
underweighted

Figure 9B

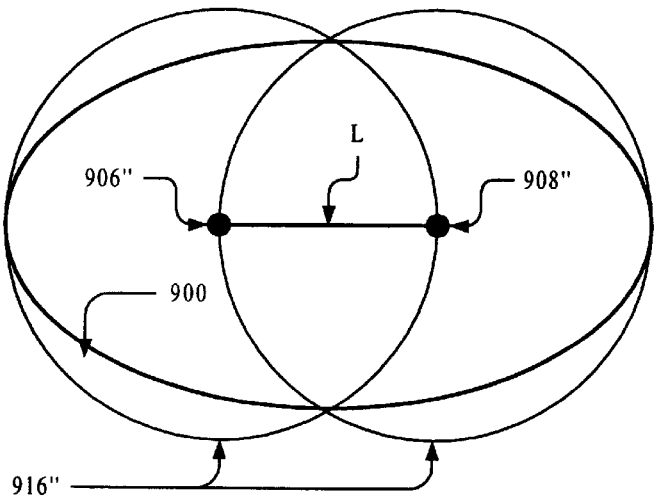

majorRadius = 1.749
minorRadius = 1
realNumberOfProbes =2.498
numberOfProbes = 2 probes "fattened" in order to
overlap sufficiently and
include ellipse ends, but some
blurriness from area to the
sides of the ellipse

Figure 9C majorRadius = 1.751
minorRadius = 1
realNumberOfProbes =2.502
numberOfProbes = 3 probes spaced one filter
radius apart sample data
outside ellipse footprint majorRadius = 1.751
minorRadius = 1
realNumberOfProbes =2.502
numberOfProbes = 3 probes overlap more and stay
within ellipse footprint

TECHNIQUES FOR ANISOTROPIC TEXTURE MAPPING USING MULTIPLE SPACE-INVARIANT FILTERING OPERATIONS PER PIXEL

FIELD OF THE INVENTION

This invention relates generally to computer graphic systems, and more particularly to a method and apparatus for applying texture to images rendered on a pixel-based display device.

BACKGROUND

Texture mapping is a technique for shading surfaces of three-dimensional (3-D) objects with texture patterns when rendering the objects, typically, onto a two-dimensional (2-D) display screen whose pixels are indexed by (x, y) coordinates. Applying textures to surfaces of 3-D objects can produce realistic images. For example, applying a wood grain texture to a desk surface produces a more realistic object than simply shading the surface with a uniform color. To model such a complex surface as a multitude of small triangles, however, each with a slightly different color, requires too many triangles to render efficiently. Instead, the surface is modeled with a small number of triangles, and pre-computed texture images or photos are mapped onto the triangles.

Texture data samples representing the texture image are stored in data elements called texels, organized as an array called a texture map. Each texel is a point that is usually associated with color and transparency information, but may be associated with data that affects surface normal vectors ("bump mapping") or with data that affects the surface position ("displacement mapping"). Texels are indexed by (u, v) coordinates for 2-D textures, or (u, v, w) coordinates for 3-D textures.

When a 3-D object is rendered on the display screen, the pixel data are modified by the texture data. To determine which texture data affect a given pixel, a filter is placed over the pixel and projected onto the texture map, producing a footprint of the pixel filter on the texture map in (u, v) coordinates. This pixel filter footprint is then approximated by a filter that is efficient to implement. Those texels covered by the approximating filter are read, weighted, and accumulated; the result then modifies the display value of that pixel.

Some filtering techniques such as point sampling and bilinear filtering, for example, emphasize simplicity and efficiency at the cost of visual quality. These techniques use information only about the projection of the center of the filter onto the texture map and ignore the size and shape of the resulting footprint. Point sampling, for instance, projects the center of a given pixel to a (u, v) point in the texture map, rounds the u and v coordinates to the nearest integer, and uses the texture data at the integer coordinates to determine the texture for that pixel. However, this filter does a poor job of rejecting high frequencies that cannot be reproduced on the display screen, producing objectionable artifacts as a result.

Like point sampling, bilinear filtering also projects the center of the pixel onto the texture map, but uses a 2 by 2 square texel linear filter that covers up to four texels. The covered texels are read, weighted, and accumulated. The weight applied to each covered texel is linearly related to the horizontal u and vertical v distances of that covered texel from the center of the filter. Although this wider filter coverage and distance-based weighting substantially improves the visual quality over point sampling, bilinear filtering can still produce artifacts when neighboring pixels on the display project to widely separated texels in the texture map. This occurs when the projection of a pixel filter maps to a large footprint in texel coordinates containing many more than the four texel samples that are bilinearly filtered.

This led to the development of a texture filtering technique called trilinear mip-mapping. Central to this technique is the mip-map, which stores the texture image at varying levels of resolution or detail (LOD). During rendering, mip-mapping computes a real lod value that determines which two levels of detail closely resemble the scale of the projected pixel and reads texels at those levels. Trilinear mip-mapping, for example, selects two adjacent levels of detail, bilinearly filters four texels from each of the two selected levels, and linearly weights and averages the two bilinear texel values. The weight given to each of the bilinear texel values depends on the relative closeness of each level of detail from which the texels were read to the computed lod value.

Trilinear mip-mapping, however, can still produce blurred or aliased textures for surfaces that are obliquely angled away from the viewer. These problems arise because trilinear mip-mapping, like other space-invariant isotropic filtering methods such as point sampling and bilinear filtering, approximate the projection of the pixel filter onto the texture map with a footprint that has the same symmetrical shape and orientation for each pixel in the image. In practice, however, projections of the pixel filter onto a texture map can produce footprints that, from pixel to pixel, vary in size, shape, orientation, and position. The single filter footprint shape and orientation in texture space used by isotropic filtering methods like bilinear filtering and trilinear mip-mapping may poorly approximate the area covered by these true projected footprints. Another problem with bilinear and trilinear texture mapping is the square filter footprint in screen coordinates. In general, circular filters in screen coordinates, which map to ellipses in texture coordinates, require processing fewer texels than square filters for an equivalent level of visual quality.

Ideal texture mapping, then, should use a circular pixel filter projected onto texture maps. Ideal texture mapping should also be anisotropic (i.e., space-variant) and vary the size, shape, and orientation of the filter used to sample the texels in order to better approximate the elliptical footprints produced by projecting the circular pixel filters. One technique, the Elliptical Weighted Average (EWA) filter, closely approximates the size, shape, and orientation of the projected elliptical footprint. Each texel is evaluated to determine whether it is inside a bounding area that contains the ellipse. All texels inside the ellipse are sampled, weighted, and accumulated. The resulting value is divided by the volume of the elliptical filter in texture coordinates. The complexity of EWA, though, has precluded hardware implementation thus far.

Others have attempted to simplify this complexity by using a series of trilinear filtering operations, but these techniques have considered the computation of the exact ellipse parameters to be too difficult and costly to implement, and instead have used poor approximations of the ellipse parameters. Generally, these approximations underestimate the length of the major axis of the ellipse, introducing unnecessary aliasing, and overestimate the length of the minor axis, introducing unnecessary blurring. Further, such approximations can substantially deviate from the slope of the major axis, which introduces even more blurring and aliasing. While such methods may simplify computations, their results are of noticeably inferior visual quality when compared to the EWA.

Thus, a method and an apparatus are needed for performing anisotropic texture mapping that can vary the attributes of a filter according to the projected pixel filter footprint and produce clearer images without introducing aliasing artifacts and becoming computationally burdensome or mathematically complicated.

SUMMARY OF THE INVENTION

The present invention relates to a method and a computer system for applying a texture image to an object when rendering the object on a display device. The texture image is stored at varying levels of detail in a set of texture maps (a mip-map). Each texture map in the mip-map is associated with one of the levels of detail.

In terms of the method, the invention projects a pixel filter onto one of the texture maps to define an elliptical footprint covering texture data in that texture map. The footprint has a major axis and a minor axis. The method determines sample points on a line in the footprint that closely approximates the major axis of the footprint. Texture data are sampled at the sample points to determine a texture value for each sample point. Each texel value contributes to a final texture value for modifying the pixel. In one aspect of the invention, a weight is applied to each texture value to produce weighted texture values that are to be combined to produce the final texture value for modifying the pixel.

In another aspect, the length of the minor axis is used to determine a level of detail at which to sample texture data. In one embodiment of the invention, a new level of detail is determined for each sample point.

In yet another aspect of the invention, the length of the minor axis is increased when texture data would be excluded from sampling or would be under-weighted. Increasing the length of the minor axis increases the area covered by a space-invariant filter that is used to sample the texture data at the sample points. In still another aspect of the invention, the length of the line is decreased when the sampling would include texture data beyond an end of the footprint.

In terms of the computer system, the invention includes a memory for storing the texture image at varying levels of detail in a set of texture maps. Each texture map is associated with one of the levels of detail. The system includes means for projecting a pixel onto one of the texture maps to define a footprint covering texture data in that texture map. The footprint has a major axis and a minor axis. The system includes means for determining sample points on a line in the footprint. This line closely approximates the major axis of the footprint. The system further includes means for sampling texture data at the sample points to determine a texture value for each sample point. Each texture value contributes to a final texture value for modifying the pixel.

In one aspect, the computer system includes a means for determining a level of detail at which to sample texture data based on the length of the minor axis. In one embodiment, the means for determining a level of detail determines a new level of detail for each sample point.

In another aspect, the system further includes means for applying a weight to each texture value to produce weighted texture values that are to be combined to produce the final texture value for modifying the pixel.

BRIEF DESCRIPTION OF THE DRAWINGS

An embodiment of the invention will be described with reference to the accompanying drawings, in which:

FIGS. 9A, 9B, and 9C show alternative methods for filtering the area covered by the ellipse when the numberOfProbes is less than the realNumberOfProbes;

DETAILED DESCRIPTION OF AN EMBODIMENT

System Overview

Figure 1:
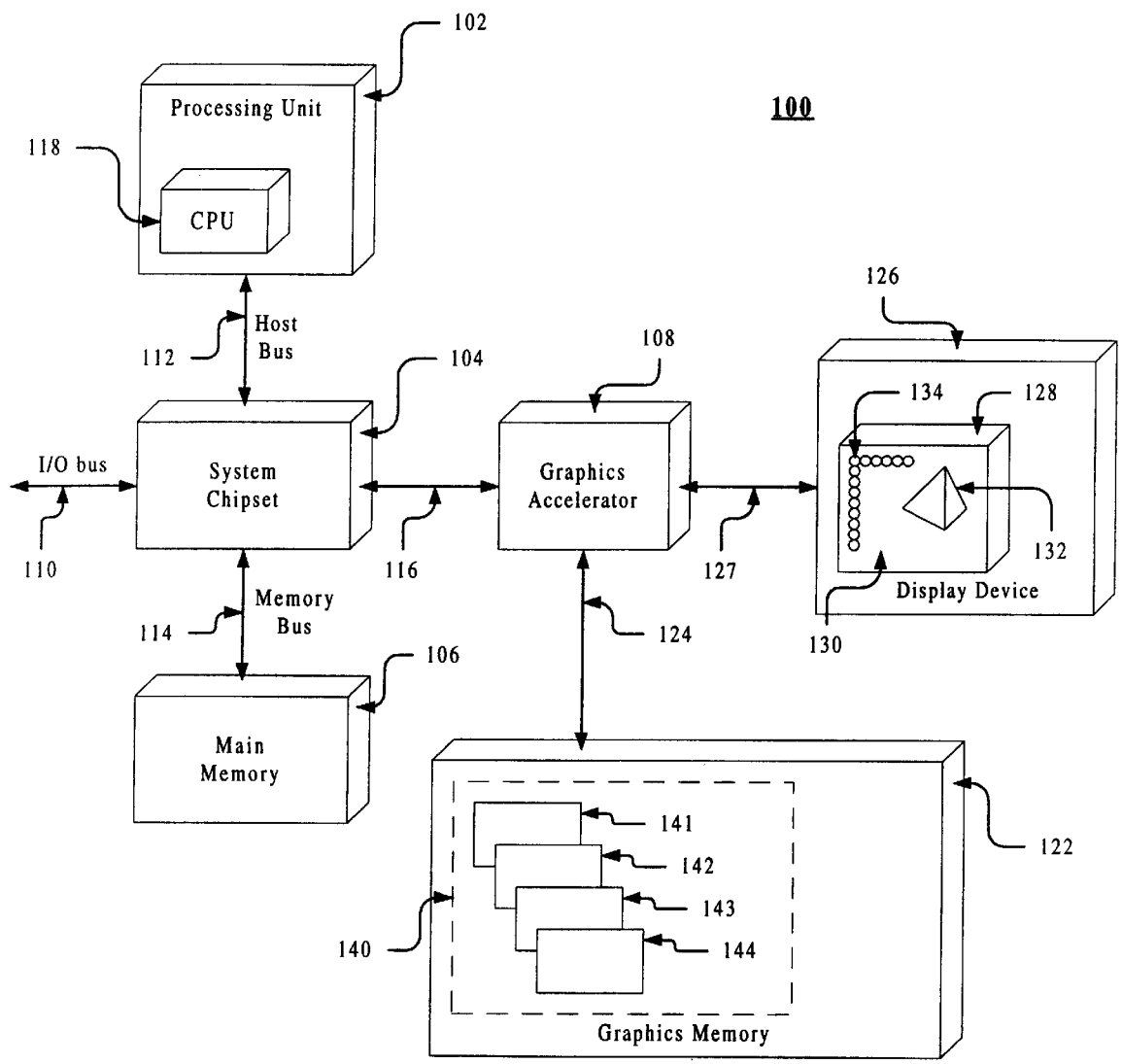
FIG. 1 is a block diagram of an exemplary computer graphics system embodying the principles of the invention.

FIG. 1 shows a computer system 100 embodying the principles of the invention. The system 100 can generate monochrome or multicolor 2-D and 3-D graphic images for display, which are given texture according to the principles of the present invention. In the computer system 100, a system chipset 104 provides an interface among a processing unit 102, a main memory 106, a graphics accelerator 108, and devices (not shown) on an I/O bus 110. The processing unit 102 is coupled to the system chipset 104 by the host bus 112 and includes a central processing unit (CPU) 118. The main memory 106 interfaces to the system chipset 104 by bus 114.

The graphics accelerator 108 is coupled to the system chipset 104 by a bus 116, to a graphics memory 122 by a bus 124, and to a display device 126 by a bus 127. The display device 126 includes a raster display monitor 128 for producing color images on a display surface or screen 130. The invention can also be practiced with a monochrome monitor that displays gray-scale images, with a printer that prints black and white or color images, or with any other pixel-based display such as a liquid-crystal or dot matrix displays.

The display screen 130 includes a 2-D array of data elements called pixels and produces an image 132 by illuminating a particular pattern of those pixels 134.

Conventionally, the pixels have (x, y) Cartesian coordinates. The image 132, for example, can be 2-D alphanumeric characters or a 3-D scene filled with objects. The graphics memory 122 includes storage elements for storing an encoded version of the graphical image 132. There is a direct correspondence between the storage elements and each pixel 134 on the display screen 130. The values stored in the storage elements for a particular pixel, referred to as pixel data, control the intensity of the particular pixel 134 on the screen 130.

Mip Map

The graphics memory 122 also stores texture data organized in a mip-map 140. The mip-map 140 is an ordered set of texture maps 141–144 that each store texture data representing a predetermined texture image. The set of texture maps provides a range of resolutions or levels of detail (LOD) of that texture image. Each texture map is a 2-D array of data elements that store texture data representing the predetermined texture image. Conventionally, each data element of the 2-D array, called a texel, has a (u, v) coordinate. The principles of the invention also can be practiced with 1-D, 3-D, and 4-D texture maps.

For the purpose of illustration, the exemplary mip-map 140 includes four texture maps 141–144. Each texture map in succession provides less detail of the texture image. For example, the base texture map 141 provides the highest resolution of the texture image. Texture map 142 is a scaled down version of the base texture map 141 with half as many texels along each dimension u and v, and thus contains one fourth as many texels. This four-to-one texel area scaling continues to the next texture map 143 in the ordered set and again to the map 144 of lowest resolution.

Each texture map 141–144 in the mip-map is associated with an integer LOD value. In general, for a base texture map with array dimensions $2^n$ by $2^m$, the integer LOD value of the texture maps in the mip-map ranges from 0 to p, where p=MAX(n, m). An integer LOD value equal to 0 corresponds to the base texture map, while a LOD value of p corresponds to the texture map that provides the lowest resolution in the mip-map. Texture map LOD p is a single texel that represents the average of all texels in the base texture map, LOD 0. For the exemplary mip-map 140 with texture maps 141–144, n and m both equal 3, and the LOD range is [0,3].

In general, a floating-point lod value is used to indicate the ideal texture map in which to sample and filter texels for a given pixel. If the floating-point lod value is larger than p, then the value is clamped to p. The integer component of the floating-point lod value is used to select the two integer mip-map levels that most closely bound the floating-point value. The fractional component of the floating-point lod value is used to interpolate between those two texture maps. Lance Williams provides more details for generating and using mip-maps for texture mapping in "Pyramidal Parametrics" of Computer Graphics, vol. 17, no. 3, July 1983 (Proceedings of SIGGRAPH 1983), incorporated by reference herein.

General Operation

During operation, the processing unit 102 can issue graphics commands requesting that an image be rendered. The chipset 104 sends the graphics commands to the graphics accelerator 108, which executes the commands, converting the object into primitives and then into fragments. A primitive is a graphical structure, such as a line, a triangle, a circle, or a surface patch of a solid shape, which can be used to build structures that are more complex. A fragment is a 2-D polygon created by clipping a primitive of the image 132, such as a line, triangle, or circle, to the boundaries of a pixel. The graphics accelerator 108 renders the fragments, and loads the pixel data corresponding to the fragments into the appropriate storage elements of the graphics memory 122. While rendering each fragment, the graphics accelerator 108 may determine a texel value, according to the principles of the invention, for modifying the pixel data. When the CRT monitor 128 renders pixel data modified by the texture data, the displayed image 132 has a texture.

The graphics accelerator 108 determines which texels affect a given pixel by projecting (i.e., mapping) a pixel filter onto selected texture maps of the mip-map 140. This mapping produces a pixel-filter footprint in each selected texture map. This pixel-filter footprint defines an area of covered texels, which can be sampled and filtered. According to the principles of the invention, a line (L) is computed in the pixel-filter footprint of each selected texture map. Each pixel-filter footprint has an elliptical shape, and the line (L) in each selected texture map closely approximates the major axis of the elliptical footprint in that map. Texels are filtered with a space-invariant filter, such as a trilinear mip-map filter, at computed sample points (i.e., probes) on the line (L) in each selected texture map. The trilinearly determined texel values are weighted and combined to produce the final texel value for modifying the final value of the pixel.

Pixel Filter

Figure 2:
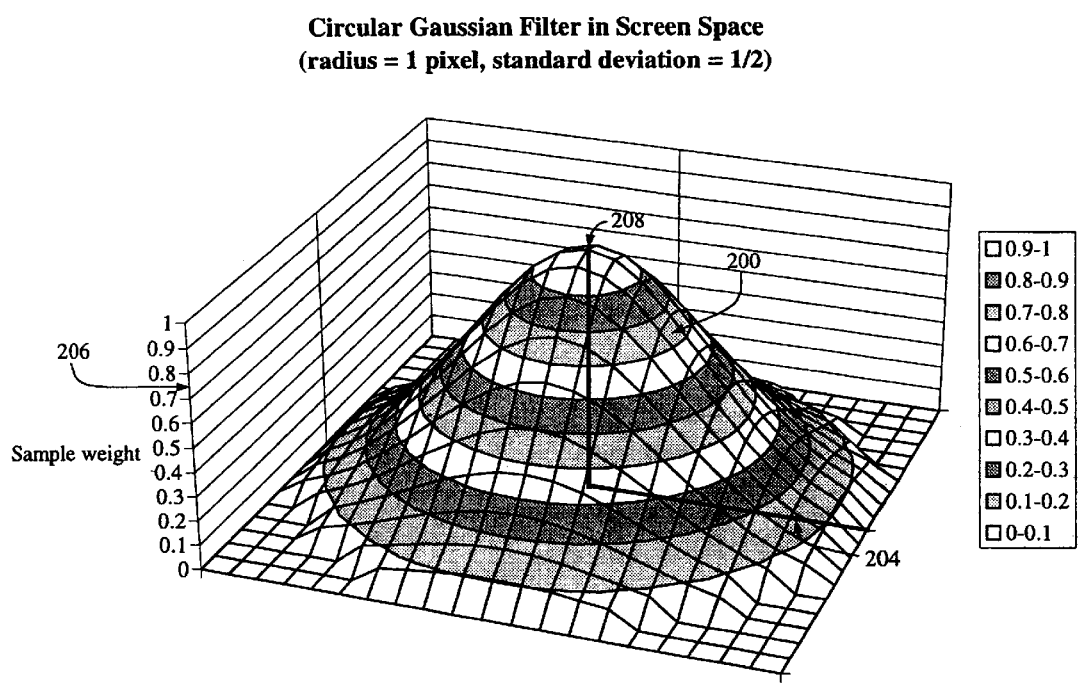
FIG. 2 is a circularly symmetric Gaussian filter in (x, y) screen coordinates.

FIG. 2 shows a 3-D view of an exemplary pixel filter 200 that can be placed over a pixel in screen coordinates. The pixel filter 200 is a circular Gaussian filter with a radius 204 of one pixel. (A one-pixel radius is the minimum filter size that still produces good high frequency rejection. A wider pixel filter may be preferable, but the filter would map to more texels in texture map coordinates and, consequently, would be less efficient during the texture mapping process.) Each grid line is $\frac{1}{10}^{th}$ of a pixel. The vertical axis 206 represents a relative weight given to samples at location (x, y). At a distance of the radius 204 from the center 208 of the filter 200, a sample would be given a weight that is $\frac{1}{16}^{th}$ of the weight at the filter center 208.

Pixel-Filter Footprint

Figure 3:
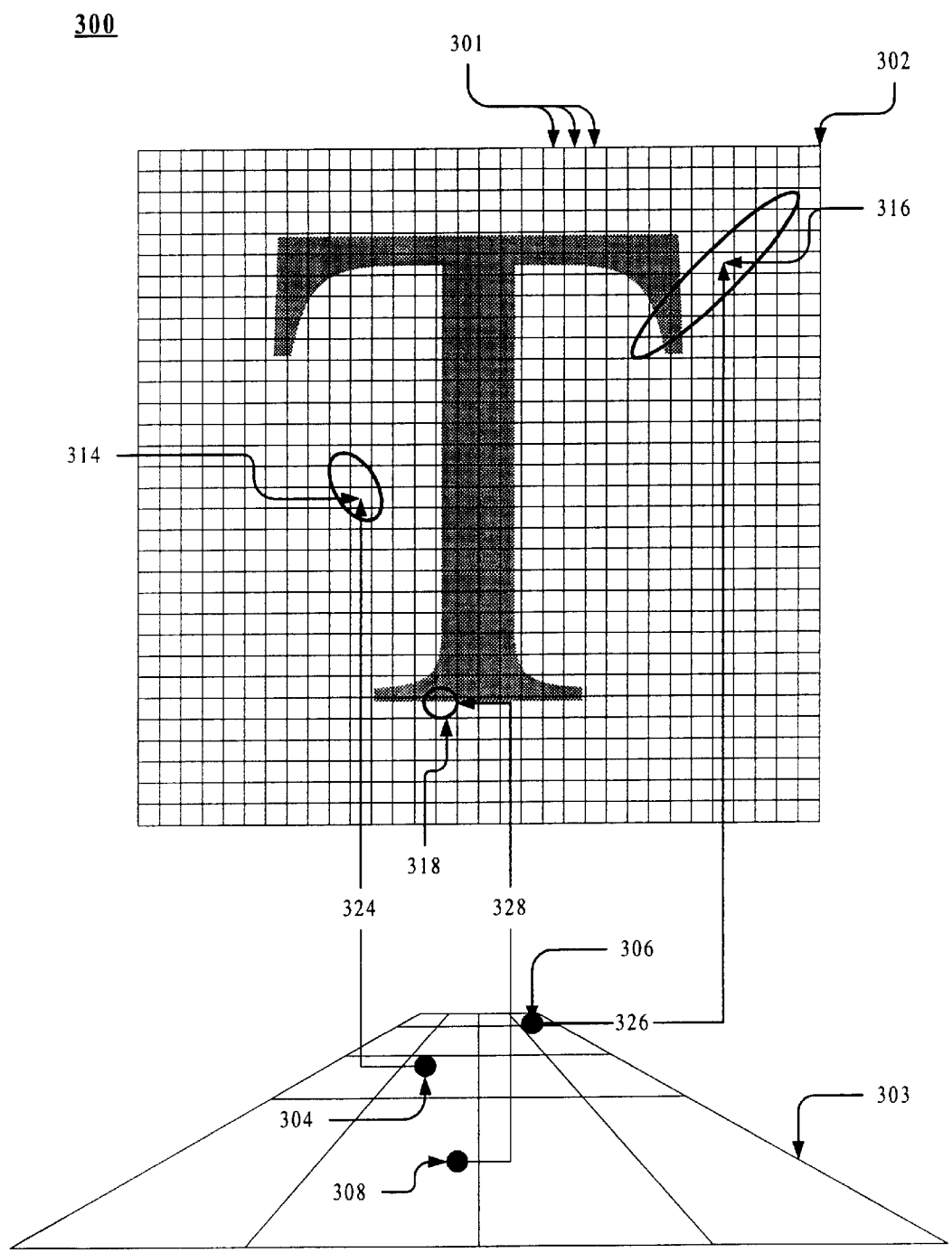
FIG. 3 is an exemplary projection of circular pixel filters onto an exemplary texture map.

Projecting the circular pixel filter 200 back onto a texture map defines an elliptical pixel-filter footprint in texture map coordinates. The size, shape, and orientation of the pixel-filter footprint varies depending upon the (x, y) coordinate of the pixel on the display screen and the angle of projection. To illustrate, FIG. 3 shows an exemplary perspective projection 300 of a circular pixel filter placed over pixels 304, 306, 308 onto an exemplary texture map 302. The texture map 302 is a 2D-array of texels 301. The texels 301 store data representing the texture pattern 'T'. In the perspective projection 300, the circular pixel filters (i.e., circles) 304, 306, 308 in the (x, y) screen coordinate system 303 map to ellipses 314, 316, 318 in the texture map 302. Circle 304 projects to a long, narrow (that is, eccentric) ellipse 314, circle 306 to a large, more eccentric ellipse 316, and circle 308 to a small, nearly circular ellipse 318. These projections are indicated by the directed arrows 324, 326, 328 from the circles 304, 306, 308 to the ellipses 314, 316, 318, respectively. Ned Greene and Paul Heckbert describe a process for projecting a circular Gaussian pixel filter in (x, y) screen coordinates to ellipses in (u, v) texture coordinates in "Creating Raster Omnimax Images from Multiple Perspective Views Using The Elliptical Weighted Average Filter," IEEE Computer Graphics and Applications, pp. 21–27, June 1986. In his thesis, "Fundamentals of Texture Mapping and Image Warping", Report No. UCB/CSD 89/516, June 1989, Computer Science Division, University of California, Berkeley, Heckbert provides a more detailed theoretical justification for this process. Both documents are incorporated by reference herein.

Figure 4:
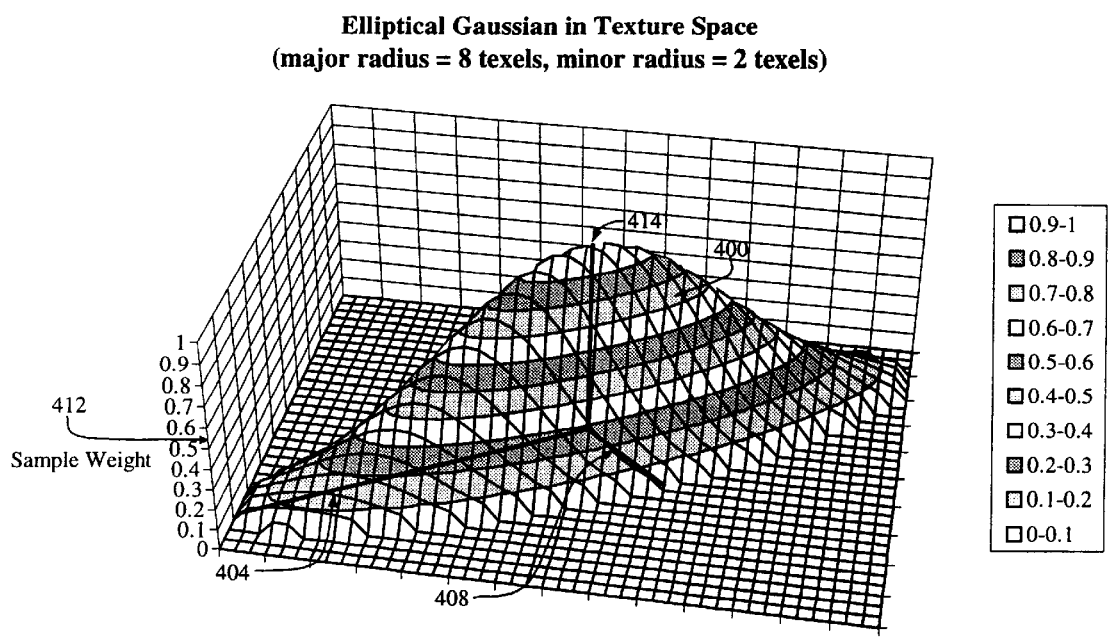
FIG. 4 is an elliptical Gaussian filter in (u, v) texture coordinates after an affine mapping of the circularly symmetric Gaussian filter of FIG. 2.

FIG. 4 shows an exemplary elliptical filter 400 produced when the circular Gaussian pixel filter 200 of FIG. 2 is projected back into texture map coordinates. Each grid line is $\frac{1}{3}^{rd}$ of a texel. The major radius 404 of the ellipse 400 is 8 texels and the minor radius 408 of the ellipse 400 is 2 texels. The vertical axis 412, which shows the near-ideal relative weighting of the texels within the ellipse 400, is greatly magnified for illustration purposes.

Ideally, the projection of the pixel filter 200 back into texture map coordinates should use the same type of projection that was used to map objects onto the display screen 130. That is, if objects are displayed on the screen using a perspective projection, then the back mapping of the Gaussian pixel filter 200 to texture map coordinates should also use a perspective projection. When using the Elliptical Weighted Averaging (EWA) method, however, the back mapping of a given pixel is actually performed with an affine projection (i.e., a parallel projection). The perspective projection at the pixel is still used to determine certain parameters about the affine mapping to texture map coordinates. This affine projection ensures that the center 208 of the pixel filter 200 in screen coordinates maps to the center 414 of the elliptical pixel-filter footprint 400 in texture map coordinates, which keeps the problem of computing weights for each texel inside the elliptical footprint 400 mathematically tractable.

At a given pixel, four partial derivatives, du/dx=ux, du/dy=uy, dv/dx=vx, and dv/dy=vy, uniquely define the affine projection of the circular pixel filter 200 into the elliptical pixel-filter footprint 400 in texture map coordinates. These four partial derivatives determine the rates at which the texture map coordinates u and v change with respect to screen coordinates x and y. The partial derivative ux denotes the partial derivative of the texture coordinate u with respect to the screen coordinate x; uy, vx, and vy are defined similarly.

Figure 5A:
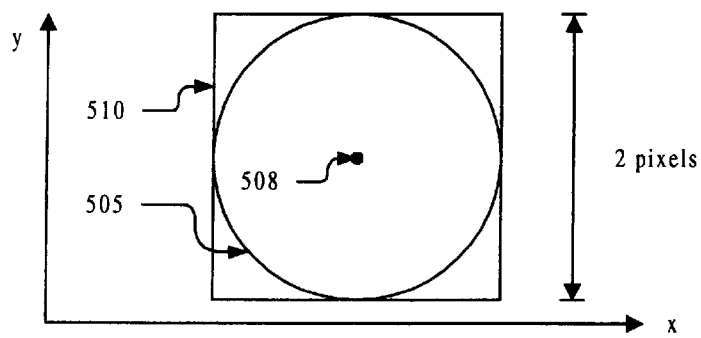
FIG. 5A is a two-dimensional view of a circular filter bounded by a square in (x, y) screen coordinates.
Figure 5B:
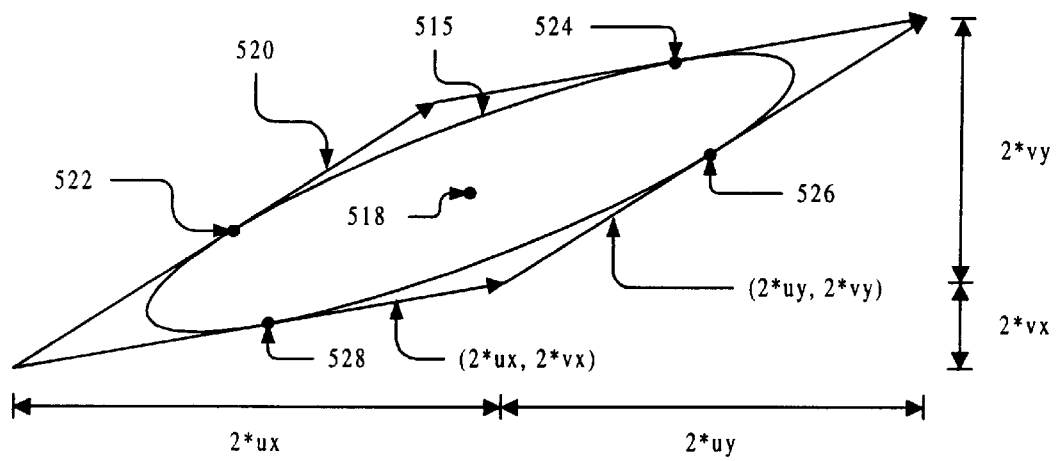
FIGS. 5B, and 5C are examples illustrating how the circle and square of FIG. 5A are transformed to an ellipse bounded by a parallelogram in (u, v) texture coordinates using partial derivatives.

FIG. 5A shows a circular pixel filter 505 in (x, y) screen coordinates inside a 2-pixel by 2-pixel square 510 aligned to the x and y axes. The circular pixel filter 505 is centered over a given pixel 508. The circle 505 tangentially touches each side of the square 510 at the midpoint of that side. As shown in FIG. 5B, an affine projection of the circular pixel filter 505 and the bounding square 510 maps to an ellipse 515 bounded by a parallelogram 520 in (u, v) texture map coordinates. The ellipse 515 touches the midpoint of each of the four sides of the parallelogram 520; these midpoints 522, 524, 526, 528 uniquely determine the length, width, and orientation of the ellipse 515. The center of the pixel 508 maps to the center 518 of the ellipse 515 and the parallelogram 520.

The lengths and orientation of the sides of the parallelogram 520 are described by the two vectors, (ux, vx) and (uy, vy), scaled by the length of a side of the square 510 in screen coordinates. For example, the EWA method uses a circular pixel filter with a radius of 1 pixel (i.e., a diameter of 2 pixels), so the sides of the square 510 each have a length of 2 pixels, and the partial derivatives are scaled by a factor of two.

Figure 5C:
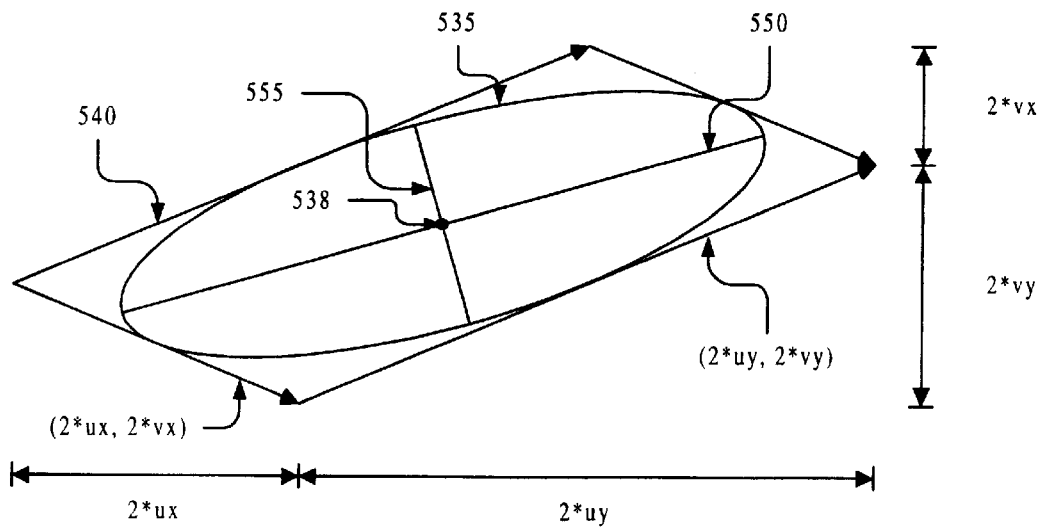

In FIG. 5B, the exemplary parallelogram 520 has positive values for all of the partial derivatives, while in FIG. 5C, another exemplary parallelogram 540 has positive values for partial derivatives ux, uy, and vy and a negative value for the partial derivative vx. FIG. 5C shows the major axis 550 and minor axis 555 of the ellipse 535. The axes 550, 555 intersect each other at the center 538 of the ellipse 535.

Trilinear Filtering Operation

The texel filtering of the invention approximates the space-variant elliptical filter by using a space-invariant filter one or more times per pixel to create a final texel value. (The elliptical footprint is a way of determining which texels should be filtered; the filter weights, which add a $3^{rd}$ dimension, approximate the elliptical filter, not just its footprint, which is an improvement over prior art.) In one embodiment of the invention, the space-invariant filter is a trilinear filter. (Other space invariant filters that can be used include a cubic filter and a Gaussian filter.) Preferably, the diameter of the trilinear filter for each sample point has the same length as the diameter of the minor axis of the ellipse. The length of the minor axis determines the appropriate LOD for each trilinear filtering operation. Alternatively, the LOD for each sample point can depend upon the width of the ellipse at that sample point.

Accordingly, one embodiment of the invention computes a floating-point lod value that causes the effective diameter of the trilinear filter to be equal to the width of the ellipse. The following exemplary pseudo-code illustrates the computation for a trilinear filter with an effective diameter of 2 texels:

$$lod = Max(0, Log_2(minorRadius)),$$

where minorRadius is ½ the length of the minor axis of the ellipse.

For example, a pixel filter that projects to an ellipse with a minor axis diameter of 8 texels (minorRadius=4) in texture map LOD 0 projects to an ellipse with a minor axis diameter of 4 texels in LOD 1 and to an ellipse with a minor axis diameter of 2 texels in LOD 2. Because the minorRadius=4, the computed value of lod is 2.0. Thus, LOD 2 would be one of the texture maps selected for trilinear filtering. In LOD 2, the width of the projected ellipse is 2 texels, which matches the 2 texel diameter of the trilinear filter.

For a given floating-point lod, the trilinear filtering operation will access the appropriate texels in the two closely bounding integer mip-map levels Floor(lod) and Floor(lod+1). For example, if the value of minorRadius is $2^{1.5}$, or approximately 2.828, and so lod is 1.5, then the two mip-map levels are LOD 1 (i.e., Floor(1.5)=1) and LOD 2 (i.e., Floor(1.5+1)=2). Thus, a trilinear filtering operation for a computed floating-point lod value (represented as lod) at sample point ($u_n$, $v_n$) involves:

1). bilinearly filtering the texture map LOD Floor(lod) using a 2×2 block of texels centered at ($u_n$>>Floor(lod), $v_n$>>Floor(lod));

2) bilinearly filtering the texture map LOD Floor(lod+1) using a 2×2 block of texels centered at ($u_n$>>Floor(lod+1), $v_n$>>Floor(lod+1)); and 3) linearly combining the results of the two bilinear filtering operations using the fractional component of lod.

A slight adjustment to the above calculations of $u_n$ and $v_n$ is needed for texture maps that are not square.

When the minorRadius is a power of two, and so the computed lod is an integer (the fractional component is 0), the trilinear probe filters an area of exact size. For example, when minorRadius is 2 (that is, the minor axis of the ellipse is 4 texels in diameter), the computed lod is 1. The trilinear filtering operation fetches an area with diameter 2 from LOD 1, which corresponds to an area with diameter 4 in the base texture map LOD 0. The operation also fetches an area with a diameter of 2 from LOD 2, which corresponds to an area with diameter 8 in the base texture map LOD 0. The LOD 1 bilinear result is weighted with 1.0, however, while the LOD 2 bilinear result with 0.0. Thus, the weighting effectively uses the full value of the LOD 1 result and discards the LOD 2 result.

When the value of lod includes a fractional component, such as, for example, the "0.6" of 1.6, then a bilinear filter with diameter 2 in Floor(lod) corresponds to an area in the base texture LOD 0 that is smaller than desired, and a bilinear filter with diameter 2 in Floor(lod+1) corresponds to an area in the base texture LOD 0 that is larger than desired. In this event, the trilinear filter uses the fractional component of lod to weight the two bilinear filter results appropriately to approximate a bilinear filter with a radius of 2 in the non-existent texture map LOD lod.

Figure 6:
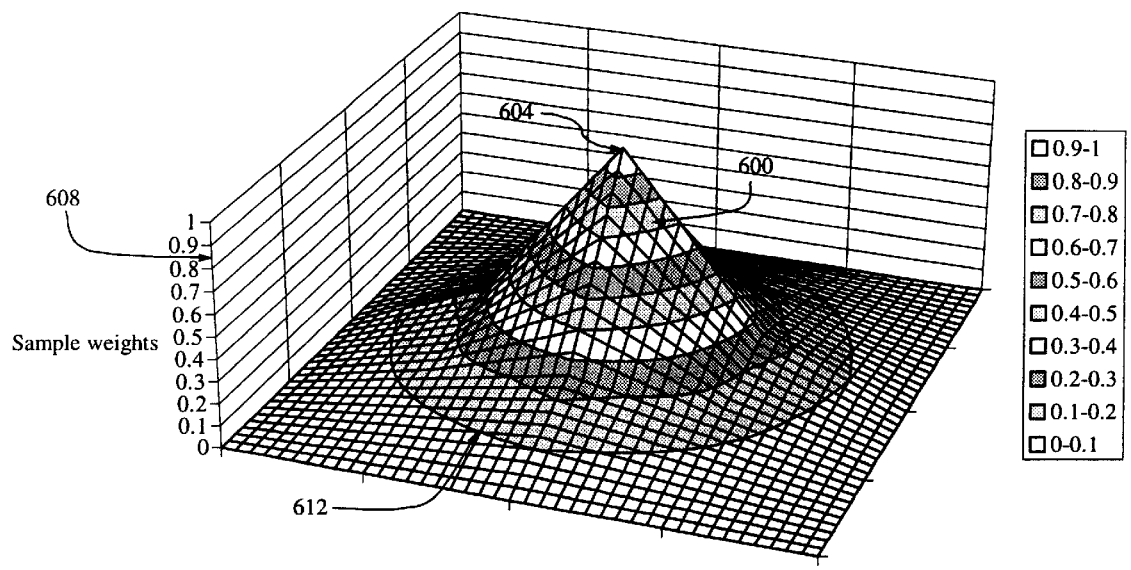
FIG. 6 is an exemplary separable trilinear filter.

For example, FIG. 6 shows a 3-D graph of an exemplary trilinear filter 600 that combines the results of two bilinear filtering operations. The trilinear filter 600 approximates a 1.414 texel radius of the minor axis (lod=0.5), and so equally weights the bilinear filter results in LOD 0 and LOD 1. Each grid line is 1/10th of a texel. The vertical axis 608 indicates the weight given to texels covered by the filter 600, with the center 604 of the filter 600 being the most heavily weighted region. Although the footprint of the trilinear filter is square, the isocontour line 612, showing the region in which the relative weight is 0.1, is nearly circular. Because most of the trilinear filter's volume is within this circular region, the trilinear probes are hereafter drawn with a circular footprint.

Sampling line (L)

For best results, the multiple space-invariant filtering operations should sample an area of texels that closely approximates the shape of the ellipse. Preferably, the sampling points occur along the major axis of the projected ellipse. Accordingly, the preferred sampling line L should closely approximate the major axis. Determination of the sampling line L, then, entails the computation of certain parameters of the projected ellipse, including the lengths of the minor and major axes.

Computation of Ellipse Parameters

The computation of ellipse parameters from the four partial derivatives is described in Heckbert's thesis, noted above. If the center of the pixel (x, y) maps to the texture coordinates $(u_m, v_m)$, then the coefficients of the biquadratic equation $A(u-u_m)^2+B(u-u_m)(v-v_m)+C(v-v_m)^2<1$ that describes the ellipse, are:

$A=vx^2+vy^2$;

$B=-2*(ux*vx+uy*vy)$;

$C=ux^2+uy^2$;

$F=A*C-B^2/4$;

$A=A/F$;

$B=B/F$;

$C=C/F$;

From the ellipse coefficients A, B, and C, the major and minor axes of the ellipse are derived:

```
root = sqrt((A - C)² + B²);
A' = (A + C - root)/2;
C' = (A + C + root)/2;
majorRadius = sqrt(1/A');    // length of major axis radius of the ellipse
minorRadius = sqrt(1/C');    // length of minor axis radius of the ellipse
theta = arctan(B/           // angle of one of the two axes, we want it to
(A - C))/2;                 // be the major axis
if (A > C) {
    // theta is now the angle of the minor axis, counterclockwise from the
```

```
-continued

// u-axis. Make theta the angle of major axis, which is perpendicular
    // to the minor axis.
    if (theta > 0) theta = theta - π/2; else theta = theta + π/2;
}
```

From these ellipse parameters, the number of sample points to be taken for computing the final texel value, hereafter represented by the variable numberOfProbes, is derived.

Number of Sample Points

The numberOfProbes is derived from the ratio of the lengths of the major and minor axes of the ellipse as follows:

```
realNumberOfProbes = 2*(majorRadius/minorRadius) - 1;
numberOfProbes = Floor(realNumberOfProbes + probeRound);
if (numberOfProbes > maxProbes) {
    numberOfProbes = maxProbes;
}
```

Because the actual number of sampling points made must be an integer, the realNumberOfProbes must be converted into the integer numberOfProbes. A value, called probeRound, can be used to control the rounding of the value realNumberOfProbes. The value probeRound is chosen to be, for example, greater than or equal to 0, and less than 1; it may be a predefined constant or a programmable variable.

In one embodiment, the value of probeRound can depend upon the value of realNumberOfProbes, with the value of probeRound being near 1 for small values of realNumberOfProbes, and slowly decreasing to a value near 0 as realNumberOfProbes increases. When realNumberOfProbes is small, it is desirable for probeRound to be near 1, as otherwise rounding numberOfProbes down substantially fattens the width of the ellipse (described later), and thus can cause substantial blurring. As realNumberOfProbes increases, rounding down causes a relatively small amount of fattening. In these cases it is desirable for probeRound to be near 0, which reduces the average number of sample points per pixel, and thus increases performance.

The numberOfProbes can be clamped to a maximum value, e.g., maxProbes =15, to guarantee that the sampling for a pixel occurs in constant-time. The clamping can be attained by allowing the trilinear probes to be spaced further apart than desirable, or by decreasing the length of the major axis of the ellipse, both of which cause aliasing. Alternatively, and preferably, the clamping can be attained by increasing the length of the minor axis, which introduces blurring.

Conceivably, the numberOfProbes may be such that the ellipse will be sampled at fewer sample points than desired. Preferably, the sample points are spaced apart along the major axis of the ellipse at distances equal to the radius of the trilinear filter because such spacing achieves optimal weightings of the texel samples. The numberOfProbes, however, can be smaller than the realNumberOfProbes when either the value of the realNumberOfProbes is rounded down or the numberOfProbes is limited to some maximum value. In such events, the minorRadius can be increased sufficiently to separate the sample points from each other by the radius of a trilinear filter. Increasing the minorRadius "fattens" the width of the ellipse, which increases the computed lod value and the effective radius of the trilinear filter used to sample the texels. The following pseudo-code can be used to increase minorRadius:

```
if (realNumberOfProbes > numberOfProbes) {
    minorRadius = (2*majorRadius)/(numberOfProbes + 1);
}
```

Stepping Vector (rdu, rdv)

The midpoint of the sampling line (L) is a reference point about which the trilinear filtering operations occur. The stepping vector (rdu, rdv) represents the fixed stepping distance between each sample point along the sampling line (L). The variable rdu represents the stepping distance in the u direction, and the variable rdv in the v direction. One method for deriving the stepping distances rdu and rdv uses the previously-computed ellipse parameters, the numberOfProbes, and the possibly "fattened" minorRadius as illustrated by the following pseudo-code:

```
lineLength = 2*(majorRadius - minorRadius);
if (numberOfprobes == 1) {
    rdu = rdv = 0;
} else {
    rdu = cos(theta) * lineLength/(numberOfProbes - 1);
    rdv = sin(theta) * lineLength/(numberOfProbes - 1);
}
```

An alternative method avoids the above computations of the ellipse parameters and the transcendental functions cos and sin by substituting the simpler method of:

1) determining the shorter of the two vectors (ux, vx) and (uy, vy) of FIG. 5B;
2) computing a ratio of the shorter vector length to the longer vector length, a value ranging between 0 and 1;
3) computing the absolute value of a representation of the angle from the longer vector to the shorter vector, a value ranging between 0 and 1;
4) using the ratio and the absolute value as indices to a small two-dimensional table (called the ellipse parameter table) that contains pre-computed data about the ellipse; and
5) computing rdu and rdv from the pre-computed data.

The pre-computed data stored in the table include the numberOfProbes as computed above; two scale factors, rduvScale and rduvPerpendicularScale, for scaling the longer vector and its perpendicular in order to construct the stepping vector (rdu, rdv); and a scale factor, minorRadiusScale, for scaling the length of the longer vector in order to derive the length of the minorRadius of the ellipse.

The pre-computed data are computed as though the longer vector were (1, 0) and for an array of shorter vectors at various angles. A longer vector of (1, 0) means a horizontal vector, i.e., at an angle of 0°, having a length of 1. The shorter vector is characterized by its length, ranging between 0 and 1, inclusive, and by the representation of its counter-clockwise angle relative to the longer vector, ranging between 0° to 90°, inclusive. Shorter vectors that are actually at a counterclockwise angle between 270° and 360° (a.k.a. −90° to 0°) are handled through post-processing of the pre-computed table data. Shorter vectors that are at a counterclockwise angle between 90° and 270° are implicitly rotated 180°, and thus lie between −90° and 90° degrees.

180° rotation of a vector is equivalent to negating both of its coordinates. Examining the derivation of the desired ellipse parameters, we see that negating either of the two vectors (ux, vx) or (uy, vy) does not change the desired ellipse parameters, and so this implicit rotation yields identical results to explicitly handling angles between 90° and 270°. Data are extracted from the appropriate table entry, and then combined with the actual u and v components of the longer vector to yield the true ellipse parameters and derived values (within the bounds of computation and table precision). A 16×16 table can yield good results and small errors in the computation seem visually acceptable when the representation for the angle is chosen carefully.

Choices for the representation for the counterclockwise angle between the longer and shorter vectors include the sine, cosine, and tangent of the angle. The sine of the angle can be computed as the cross product of the two vectors divided by the product of their lengths, the cosine as the dot product of the two vectors divided by the product of their lengths, and the tangent as the cross product divided by the dot product.

The sine and cosine, however, are sensitive to small changes over part of their range of values. For example, if the sine value is near 1, a small change in its value produces a large change in the angle represented by the sine. If a table is indexed by 16 equally spaced sine values ($\frac{1}{32}$, $\frac{3}{32}$, . . . , $\frac{31}{32}$), then the index may be off by ±$\frac{1}{32}$ from the computed sine. If the computed sine is 1, representing a 90° angle, then the value used to index the table is $\frac{31}{32}$, which represents approximately a 75.6° angle between vectors, a 14.4° difference from the 90° computed angle. This difference is compounded by the ellipse parameter computations, which are sensitive to the angle. The cosine has a same sensitivity as the sine, that is, a small change in a cosine value near 1 produces a large change in the angle represented by the cosine.

The tangent is substantially less sensitive than the sine and the cosine. A worst-case difference of $\frac{1}{16}$ in the tangent results in an angular difference of approximately 3.6°. Because the tangent varies from 0 to ∞ as the angle varies from 0° to 90°, however, the tangent alone does not operate as the table index for this range of angles. Rather, the table index uses the tangent and cotangent (i.e., 1/tangent) because the tangent varies from 0 to 1 as the angle varies from 0° to 45°, and the cotangent varies from 1 back to 0 as the angle varies from 45° to 90°.

Thus, the indexing to the ellipse parameter table is divided in half. When the angle is between 0° and 45°, one half of the table is indexed by the tangent of the angle. When the angle is between 45° and 90°, the other half of the table is indexed by the cotangent of the angle, which is computed as the dot product divided by the cross product. Using a 16×16 table, for example, this representation of the angle (i.e., tangent and cotangent) results in a maximum difference of about ±3.7% from the desired length of the ellipse's major axis and a maximum difference of about ±6.4° from the desired angle of the ellipse's major axis.

The following pseudo-code illustrates the exemplary process for converting the (ux, vx) and (uy, vy) vectors to table indices and using the resulting table data to compute the relevant ellipse parameters:

```
r1Len = sqrt(ux * ux + vx * vx);
r2Len = sqrt(uy * uy + vy * vy);
```

13

-continued

```
if (r1Len > r2Len)
    longU = ux;              // u component of longer vector
    longV = vx;              // v component of longer vector
    longLen = r1Len;         // length of longer vector
    lengthRatio = r2Len / r1Len;  // ratio of short to long lengths
    counterclockwise = True; // if cross product positive,
                             // short vector
                             // is counterclockwise from long
                             // vector
} else {
    longU = uy;              // u component of longer vector
    longV = vy;              // v component of longer vector
    longLen = r2Len;         // length of longer vector
    lengthRatio = r1Len / r2Len;  // ratio of short to long lengths
    counterclockwise = False; // if cross product positive, short
                              // vector
                              // is clockwise from long vector
}
crossProduct = ux * vy - vx * uy;  // cross product (ux, vx) × (uy, vy)
dotProduct = ux * uy + vx * vy;    // dot product (ux, vx) · (uy, vy)
counterclockwise =                  // flip if in 2nd or 4th quadrants
    counterclockwise ^ (crossProduct < 0.0) ^ (dotProduct < 0.0);
crossProduct = abs(crossProduct);
dotProduct = abs(dotProduct);
if (crossProduct < dotProduct) {
    // Compute tangent
    tanCotan = crossProduct / dotProduct;
} else {
    // Compute cotangent + 1.0 = 1/tangent + 1.0
    tanCotan = dotProduct / crossProduct + 1.0;
}
// Convert high-precision indices into integer indices in this examplary
// 16 × 16 table. tanCotan is between 0 and 1.99999, so
// steps of 1/8 are used rather than steps of 1/16.
iLengthRatio = (int) (16.0 * min(0.99999, lengthRatio));
iTanCotan = (int) (8.0 * min(1.999990, tanCotan));
(rduvScale,
rduvPerpendicularScale,
minorRadiusScale,
numberOfProbes) = ellipseParameterTable [iLengthRatio][iTanCotan];
if (counterclockwise) {
    // Compose stepping vector along line L from original longer vector,
    // and the longer vector rotated 90° counterclockwise.
    rdu = longU*rduvScale - LongV*rduvPerpendicularScale;
    rdv = longv*rduvScale + longU*rduvPerpendicularScale;
} else {
    // Compose major axis diameter line L from original
longer vector, and
    // the longer vector rotated 90° clockwise.
    rdu = longU*rduvScale + longV*rduvPerpendicularScale;
    rdv = longV*rduvScale - longU*rduvPerpendicularScale;
}
// Create minor axis radius length from the longer vector length
minorRadius = longLen * minorRadiusScale;
```

Figure 7A:
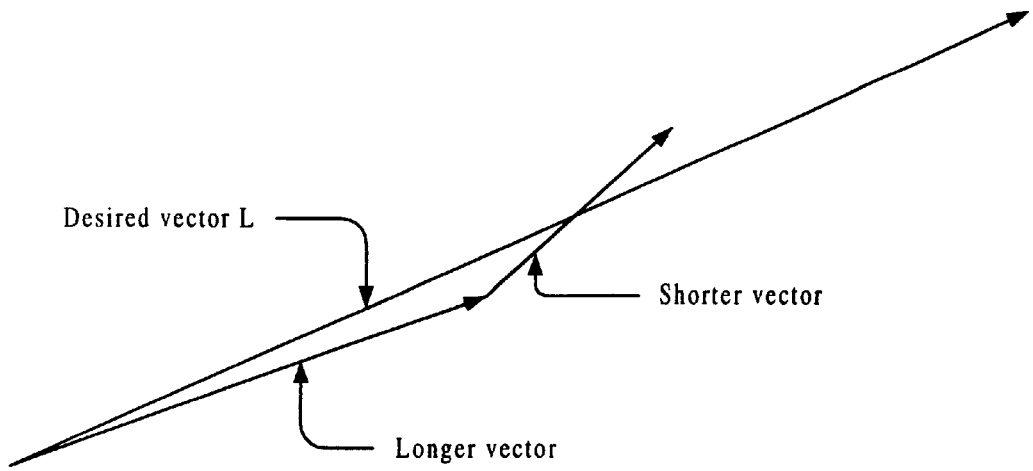
FIGS. 7A and 7B show how the longer of two partial derivative vectors, (ux, vx) and (uy, vy), can be used to construct a vector along the major axis of the projected ellipse.
Figure 7B:
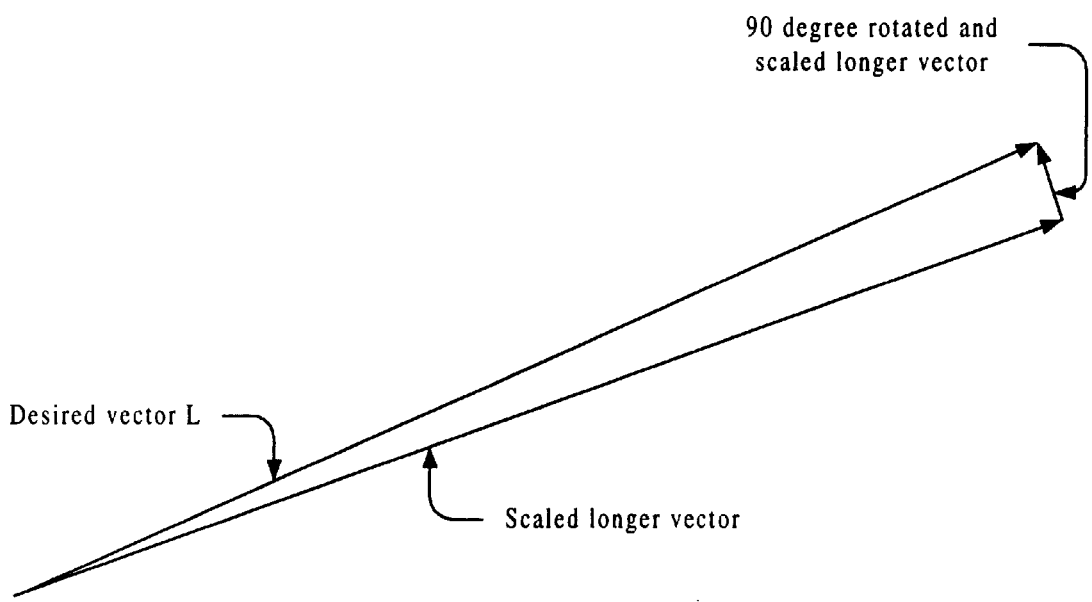

The above method for computing (rdu, rdv) has a geometrical interpretation shown in FIGS. 7A and 7B. FIG. 7A shows an exemplary longer vector, an exemplary shorter vector, and the desired sampling line L that the two vectors uniquely specify. As shown in FIG. 7B, the sampling line L can be constructed from the longer vector by appropriately scaling the longer vector, and adding a copy of longer vector that is rotated counterclockwise by 90° and scaled down, to the scaled longer vector. If the shorter vector were on the clockwise side of the longer vector, then the longer vector would still be scaled down in length, but rotated −90° (i.e., clockwise by 90°). The desired line vector L is then scaled down to create the distance between sample points vector by dividing the desired line vector L by (numberOfProbes - 1).

The construction of the exemplary 16×16 ellipse parameter table for each entry indexed by variables iLengthRatio, and iTanCotan, each variable in the range [0, 15], is as follows:

14

```
//Compute real equivalents to the indices
lengthRatio=(iLengthRatio+0.5)/16.0;
tanCotan=(itanCotan+0.5)/8.0;
```

```
// Make (ux, vx) the longer vector, a horizontal vector of length 1
ux = 1;
vx = 0;
// Make (uy, vy) the shorter vector. The shorter vector is
// lengthRatio * (cos(angle), sin(angle)), where angle is the angle between
// the longer vector and the shorter vector.
if(tanCotan < 1.0) {
    // tanCotan is the tangent of the angle
    angle = arctan(tanCotan);
} else {
    // tanCotan is 1.0 + cotangent of the angle
    angle = arccotan(tanCotan - 1.0 );
}
uy = lengthRatio * cos(angle);
vy = lengthRatio * sin(angle);
// Compute majorRadius, minorRadius, theta, numberOfProbes, rdu, and
// rdv as described above.
table [iLengthRatio, iTanCotan].numberOfProbes = numberOfProbes;
table [iLengthRatio, iTanCotan].rduvScale = rdu;
table [iLengthRatio, iTanCotan].rduvPerpendicularScale = rdv;
table [iLengthRatio, iTanCotan].minorRadiusScale = minorRadius;
```

In one embodiment of the invention, the texture (u, v) coordinates for the center of the pixel-filter footprint are computed, which is the midpoint, $(u_m, v_m)$, of the sampling line L. The midpoint corresponds to the center of the pixel and is a reference point about which trilinear filtering operations are performed. The order in which the sample points are visited is arbitrary. For example, software implementations may wish to visit the sample points outward from the midpoint to exploit symmetry to minimize computation. Hardware implementations may wish to visit the points from one end of the line L to the other to maximize the hit rate for a texel cache.

Figure 8A:
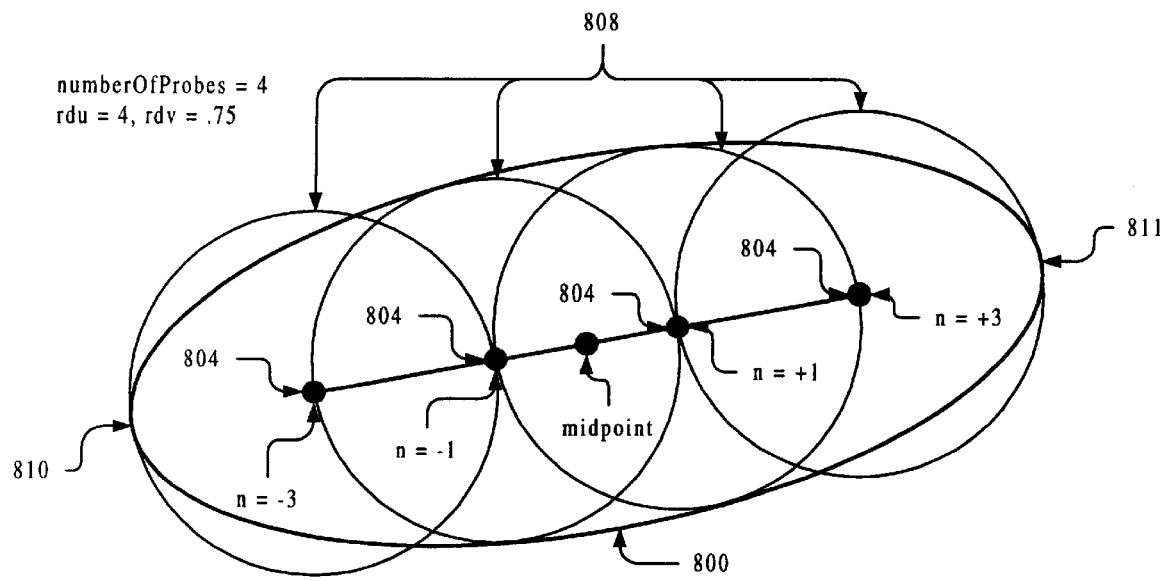
FIGS. 8A and 8B show the spacing of sample points about the midpoint of the sampling line for an even and odd number of sample points.

When the numberOfProbes is even, then the sample points are distributed symmetrically about the midpoint $(u_m, v_m)$ of the sampling line L in the following pattern:

$(u_n, v_n) = (u_m, v_m) + n/2*(rdu, rdv)$, where $n = \pm 1, \pm 3, \pm 5$,

For example, FIG. 8A illustrates an example where numberOfProbes is even (e.g., 4) for an exemplary ellipse 800. The sample points 804 are $(u_n, v_n)$, where $n = \pm 1$ and $\pm 3$. The trilinear filtering operations 808 are shown to have circular footprints, although in practice each has a square footprint. (As mentioned previously, the circular footprint more accurately represents the area in which the bulk of the filter volume resides.)

Figure 8B:
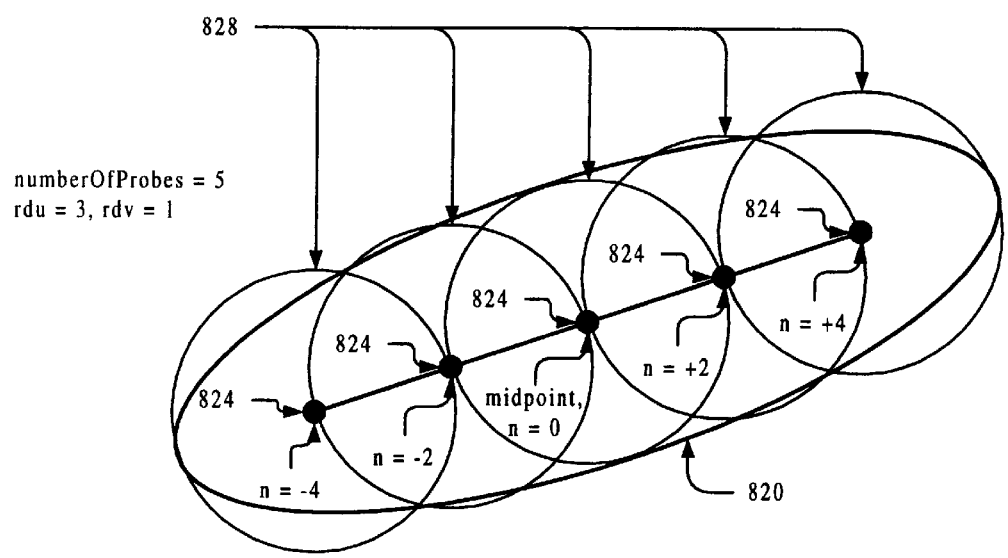

When numberOfProbes is odd, the sample points are distributed symmetrically about the midpoint $(u_m, v_m)$ in the pattern:

$(u_n, v_n) = (u_m, v_m) + n/2(rdu, rdv)$, where $n = 0, \pm 2, \pm 4, \pm 6$,

For example, FIG. 8B illustrates an example where numberOfProbes is odd (e.g., 5) for an exemplary ellipse 820. The sample points 824 are $(u_n, v_n)$, where $n = 0, \pm 2$, and $\pm 4$. As above, the trilinear filtering operations 828 are shown to have circular footprints, although in practice each has a square footprint.

Location of Sample Points On Sampling Line L

As described previously, it is preferred that the sample points be separated from each other by the radius of a trilinear filter. When numberOfProbes is less than realNumberOfProbes, however, the trilinear filters may not fully cover the elliptical footprint. For instance, FIG. 9A shows an exemplary ellipse 900 for which the majorRadius is 1.749, the minorRadius is 1, the realNumberOfProbes is 2.498, and the numberOfProbes is 2. When the distance between the sample points 906, 908 is too small for the filters 916 to fully span the ellipse 900, the ends 902, 904 of an exemplary ellipse 900 are not even sampled. (Again, the trilinear filtering operations 916 are shown with circular footprints, although in practice each has a square footprint.) As shown in FIG. 9B, for the trilinear filters 916 to span the entire ellipse 900, the distance between the sample points 906', 908' can be increased. This, however, causes the center portion 920 of the ellipse 900 to be under-weighted (i.e., the filters 916 do not sufficiently overlap). The spread of the sample points 906, 908 on the major axis for both FIGS. 9A and 9B introduce aliasing artifacts.

The preferred method is to increase the length of minorRadius, which, in turn, increases the radius of the trilinear filters 916, although this could slightly blur the image. As shown in FIG. 9C, the larger trilinear filters 916'' sample texels outside of the original ellipse 900, but produces an appropriate sample point spacing for properly sampling and weighting all texels within the ellipse 900.

Alternatively, the case where numberOfProbes is less than realNumberOfProbes can be avoided altogether by always using the ceiling of realNumberOfProbes for the value of numberOfProbes, but on the average this would produce ½ more trilinear filtering operations for each pixel than using the floor of realNumberOfProbes+probeRound, where probeRound=0.5.

Figure 10A:
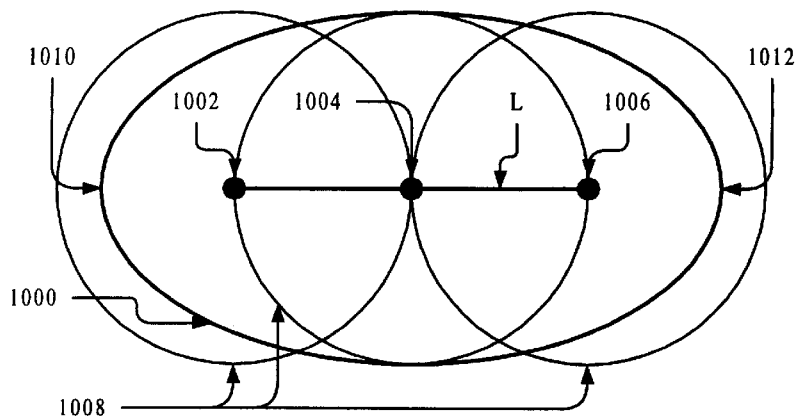
FIGS. 10A and 10B show alternative methods for filtering the area covered by the ellipse when the numberOfProbes is greater than the realNumberOfProbes.

When the numberOfProbes is larger than the realNumberOfProbes, due to rounding up realNumberOfProbes, the image can be blurred by including texels beyond the ends of the ellipse. For instance, FIG. 10A shows an exemplary ellipse 1000 with the majorRadius equal to 1.751, the minorRadius equal to 1, the realNumberOfProbes equal to 2.502, and the numberOfProbes equal to 3. The spacing between sample points 1002, 1004, and 1006 results in trilinear filtering operations 1008 that include texels beyond the ends 1010, 1012 of the ellipse 1000. Consequently, this sampling could slightly blur the image.

Figure 10B:
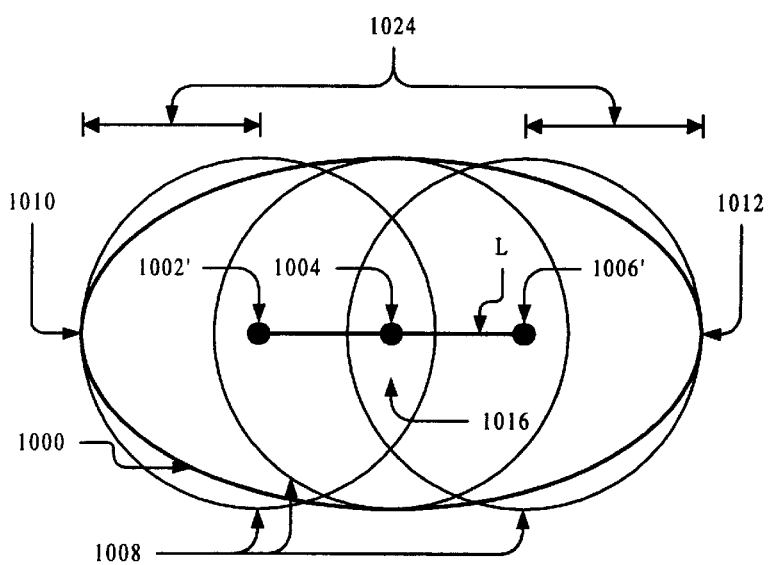

Alternatively, as shown in FIG. 10B, the sampling line L may be shortened so that the sample points 1002', 1006' closest to each end 1010, 1012 of the ellipse 1000 is separated from that end by a distance 1024 equal to the radius of the trilinear filter 1008. The line L can be shortened by reducing the spacing between each pair of adjacent sample points, or by moving just the sample points on the end of the line L to the distance 1024. This arrangement of sample points 1002', 1004, and 1006' results in fewer texels outside of the ellipse 1000 being sampled than the sample point arrangement of FIG. 10A and gives more weight to the area of overlap 1016, the most significant texel area covered by the ellipse 1000. Because reducing the length of the line L does not change the radius of the trilinear filters 1008, it does not cause texels included within the ellipse to not be filtered, and so this technique thus reduces blurring without introducing aliasing artifacts. As an alternative, the length of the minor axis of the ellipse can be reduced, but this will introduce artifacts by leaving out texels that are at the sides of the ellipse.

Alternative Embodiment

Figure 11:
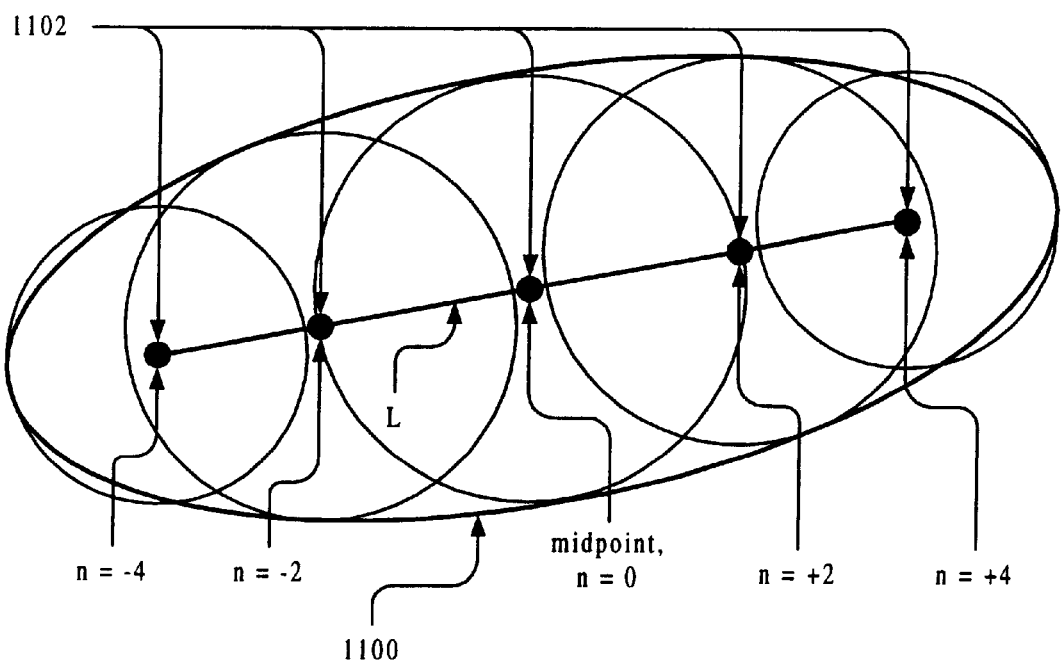
FIG. 11 is an alternative method of filtering that more closely approximates the area covered by the ellipse by decreasing the space-invariant filter radius for sample points that are farther from the midpoint of the ellipse.

FIG. 11 illustrates an alternative to using the same trilinear filter radius for every sample point on the sampling line L. The alternative is to change the level of detail (i.e., lod) as the sampling of texels covered by the ellipse 1100 steps away from the midpoint 1102 of the line L toward the line's endpoints 1104, 1106. For each sample point on the line L, this alternative embodiment determines a level of detail corresponding to the width of the elliptical footprint at that sample point. Changing the lod changes the size of the trilinear filter. Thus, as the lod decreases for those sample points farther from the midpoint 1102, so does the effective texel area covered by their corresponding trilinear filters. These filters of varying size, then, cover an area that more closely approximates the area covered by the ellipse 1100 than if the same filter radius been used for every sample point.

Moreover, decreasing the lod value means increasing the mip-map resolution; thus, the resolution increases correspondingly for sample points nearer the endpoints. Not every change in the lod value, however, necessarily results in a change from a higher-numbered LOD to a lower-numbered LOD within a mip-map, e.g., from LOD 1 to LOD 0, because the new lod value may be bound by the same two LODs as the old lod value. The change, however, will affect the values of the weights applied to the two bilinear filtering operations in each of the two mip-maps.

Because reducing the lod decreases the radius of the trilinear filter, the distance between sample points should decrease as the sample points move away from the center of line L, in order for the trilinearly filter operations to overlap sufficiently for optimally weighting the sampled texels. Thus, more sample points may be necessary to adequately sample the texels covered by the ellipse. To illustrate, for example, the ellipse 1100 is the same as the ellipse 800 of FIG. 8A, but five sample points 1102, rather than the four sample points 804 of FIG. 8A, are needed to span the ellipse 1100. These five sample points 1102, however, sample fewer texels outside of the ellipse 1100 than the four sample points 804 of FIG. 8A, particularly those points 804 near the ends 810, 811 of the ellipse 800, and so yield improved image quality.

Process of the Invention

Figure 12:
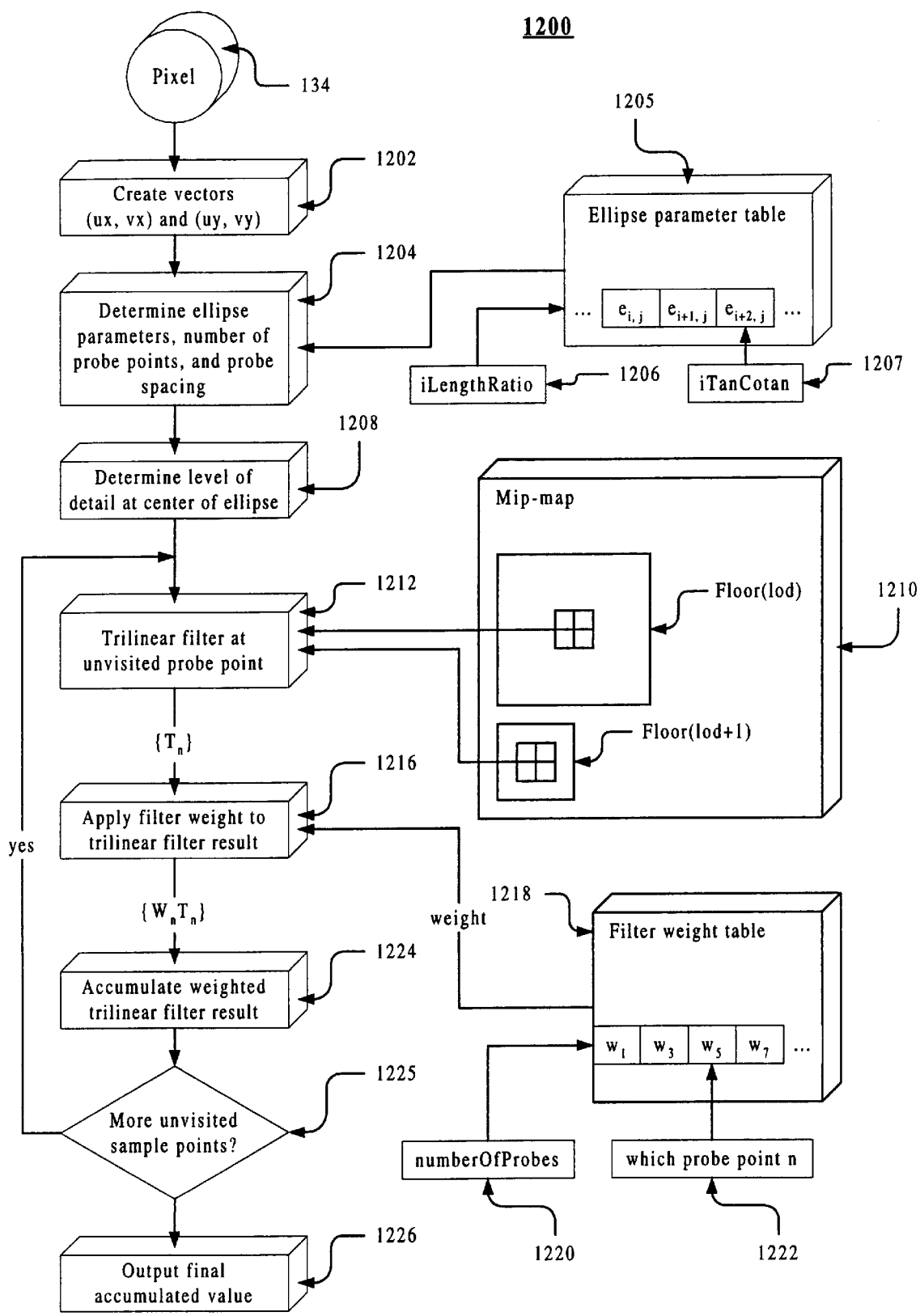
FIG. 12 is a flow diagram of a process for texture mapping a pixel according to the principles of the invention.

FIG. 12 illustrates an exemplary process 1200 for texture mapping an image according to the principles of the invention. The process 1200 applies a texture value to each pixel that defines the image to be displayed on the display device 126. A pixel filter, such as, for example, a circularly symmetrical Gaussian filter with a radius of one pixel, is centered over each pixel. The process 1200 is illustrated for a given pixel 134.

In step 1202, the (x, y) coordinates of pixel 134 are mapped into the point $(u_m, v_m)$ in the base texture map (i.e., LOD 0). The partial derivatives ux, vx, uy, and vy are computed, and the two vectors (ux, vx) and (uy, vy) are constructed.

An affine projection of the pixel filter centered over the pixel 134 produces a footprint in the base texture map (i.e., LOD 0). When the pixel filter is circularly symmetric, the footprint in texture map coordinates is elliptical (i.e., an ellipse). To closely approximate the shape of the ellipse with a series of trilinear filtering operations, the process 1200 computes various parameters about the ellipse (step 1204). The computed parameters include the length of the radius of the minor axis of the ellipse, the number of sample points to be sampled and filtered, and the stepping vector (rdu, rdv). In one embodiment, pre-computed data for computing the stepping vector can be obtained from ellipse parameter table 1205, as described above, using the ratio of vector lengths 1206 and the tangent or cotangent 1207 of the angle between the vectors as indices into the table.

At step 1208, the process 1200 determines the level of detail that is appropriate for the trilinear filtering operation at the center of the ellipse, using the minorRadius to select two texture maps (i.e., LODs) in which to sample texture data. A trilinear filtering operation samples texture data in the selected texture maps at a sample point (step 1212). The sample point is on the major axis of the ellipse. The operation produces a texel value $\{T_n\}$ for the sample point.

At step 1216, a filter weight is applied to the trilinearly filtered result computed in step 1212. One embodiment attempts to weight the area represented by the trilinear filtering operation with roughly the same weight that the EWA would use over that area. As a first approximation, the Gaussian weight value is computed that the EWA would use for that sample point. To determine the distance of that sample point from the pixel center in screen coordinates, the distance of the sample point from the center of the ellipse is computed and divided by the majorRadius:

$$\begin{aligned}\text{probeDistance} &= n/2 * \text{length}(rdu, rdv)/\text{majorRadius} \\ &= n/2 * \text{sqrt}(rdu^2 + rdv^2)/\text{majorRadius},\end{aligned}$$

where, for an even number of samples, $n=\pm 1, \pm 3, \pm 5, \ldots$, and for an odd number of points, $n=\pm 0, \pm 2, \pm 4, \pm 6, \ldots$. To compute the Gaussian weight for a sample point, the square of the probeDistance is needed. Exemplary pseudo-code to compute the weight for a given sample point n is:

sampleDistanceSquared=$n^2/4(rdu^2+rdv^2)/$majorRadius$^2$; relativeWeight=$e^{-alpha*sampleDistanceSquare}$;

where alpha is, for example, 2.0. Other values of alpha can be used.

The weights to be given to trilinearly filtered sample points can be stored in a sparse triangular two-dimensional weight table 1218. In one embodiment, the numberOfProbes is used as a row index 1220 to the table 1218. Each row of the table 1218 contains Floor((numberOfProbes+1)/2) weight values. The absolute value of the number of the sample point, (i.e., Abs(n)), is used as an index 1222 that points to the weight within a row to be applied to that sample point.

For example, when numberOfProbes equals 4, the sample points are $(u_n, v_n)$ where $n=\pm 1$, and $\pm 3$. The index 1220 points to a row in the table 1218 having two filter weights, $W_1$ and $W_3$. Applying these weights to the four trilinearly filtered sample results $\{T_{-3}, T_{-1}, T_1, T_3\}$ produces weighted sample texel values $\{W_3 T_{-3}, W_1 T_{-1}, W_1 T_1, W_3 T_3\}$.

For the alternative embodiment that computes a lod value for each sample point, the filter weight table 1218 must be extended with two more entries per column because the distance between adjacent sample points is not constant. The first additional entry specifies a multiplier for (rdu, rdv), in order to determine the two sample point locations on either side of the midpoint of line L for that weight. The second additional entry specifies an amount to subtract from the lod computed for the center of the ellipse. To determine the lod for each sample point, then, the lod is determined for the center of the elliptical footprint, and the table is accessed to obtain the offset value for each sample point, which is subtracted from the lod of the ellipse center.

By dividing each of the relative weights computed for the row by the sum of the relative weights, the table 1218 can be constructed such that the weights stored in each row entry of the table sums to 1.0. Consequently, the final accumulated texel value output in step 1226 need not be normalized. (Note, if numberOfProbes is odd, the $W_0$ entry should count half as much as the other entries when computing the sum, as it is used only once, while $W_2$, $W_4$, etc. are used twice.) Because the numberOfProbes can be clamped to a reasonable maximum value as described above, the size of the table 1218 can be small.

If, for example, probeRound is a constant 0.5, then each row of the table 1218 must supply weights for all ellipses in which numberOfProbes−0.5<=realNumberOfProbes<=numberOfProbes+0.5.

This large range can lead to substantial error in the weights stored in some rows, because each row stores a single set of weights that are applied to a wide range of ellipses. Alternatively, the ellipse parameter table 1205 described above can provide a weightTableRowIndex instead of numberOfProbes. The weight table 1218 can then have a finer granularity than the integer numberOfProbes, and this finer granularity can be used where it matters. When numberOfProbes is 1 or 2, for example, the ellipse parameter table 1205 is perfectly accurate for all the ellipses that map to 1 or 2 probes, because the rows of the table 1218 corresponding to these values of numberOfProbes store just one weight. For instance, when numberOfProbes is 1, $W_0$ is 1, and when numberOfProbes is 2, $W_1$ is 0.5. When numberOfProbes is greater than 2, however, the corresponding rows of the table 1218 store two or more weights that are applied to all ellipses mapping to that same numberOfProbes, although, ideally, each different ellipse should have its own weighting pattern.

In this case it is preferable to compute weights for ellipses within a much smaller range. For example, row 3 of the table 1218 might hold weight data for ellipses where realNumberOfProbes is between 2.5 and 2.75, row 4 for ellipses where realNumberOfProbes is between 2.75 and 3.0, and so on. The weight table can still be kept quite small, as this finer granularity is only important for relatively small values of realNumberOfProbes. At larger values of realNumberOfProbes the granularity can increase, so a row farther down in the weight table might hold weight data for ellipses where realNumberOfProbes is between 10.5 and 11.5. This finer-grained weight table needs to have an additional entry for each row, which stores the numberOfProbes appropriate for that row. Note the several rows in the weight table may have the same numberOfProbes, but have different weights for those sample points.

At step 1224, the weighted trilinear result is added to the accumulated sum of all the other weighted trilinear results computed thus far. At step 1225, if there are more sample points to process, then control returns to step 1216. Steps 1212, 1216, and 1224 repeat until a trilinear filtering operation occurs at all of the sample points along the major axis. When there are no more sample points to sample, then control passes to step 1226, and the accumulated weighted result is the final texel value used to modify the RGBA, Z, or other values of the pixel 134.

The foregoing description has been directed to specific embodiments of this invention. It will be apparent, however, that variations and modifications may be made to the described embodiments, with the attainment of all or some of the advantages. It is the object of the appended claims, therefore, to cover all such variations and modifications as come within the spirit and scope of the invention.

We claim:

1. A computerized method for applying texture data representing a texture image to an object when rendering the object on a display device, the texture image being stored at varying levels of detail in a set of texture maps, each texture map being associated with one of the levels of detail, the method comprising:

projecting a pixel onto one of the texture maps to define an elliptical footprint covering texture data in that texture map, the footprint having a major axis;

determining sample points on a line in the footprint, the line closely approximating the major axis of the footprint;

determining a level of detail for the center of the elliptical footprint;

selecting at least one texture map from which to sample texture data at each sample point based on the level of detail; and sampling texture data at the sampling points to determine a texture value for each sample point, each texture value contributing to a final texture value for modifying the pixel.

2. The method of claim 1 wherein the footprint includes a minor axis, and further comprising the steps of:
determining a length of the minor axis; and
determining a level of detail at which to sample texture data based on the length of the minor axis.

3. The method of claim 2 wherein the footprint includes a minor axis having a length, and further comprising the step of:
increasing the length of the minor axis of the footprint when texture data would be excluded from sampling at the determined level of detail.

4. The method of claim 1, further comprising the step of:
determining for each sample point a level of detail that corresponds to a width of the elliptical footprint at that sample point.

5. The method of claim 1, wherein the step of determining a level of detail for each sample point includes:
accessing a look-up table to obtain an offset value for each sample point; and
offsetting the level of detail determined for the center of the elliptical footprint by the offset value for each sample point to determine the level of detail for that sample point.

6. The method of claim 1, further comprising the step of:
increasing the distance between adjacent sample points on the line when texture data at an end of the footprint would be excluded from sampling.

7. The method of claim 1, further comprising the step of:
decreasing the length of the line when the sampling would include texture data beyond an end of the footprint.

8. The method of claim 7, further comprising the step of:
using a filter having a radius to sample texture data at a particular sample point at an end of the line; and
wherein the step of decreasing shortens the line such that the particular sample point at the end of the line is separated from the end of the footprint by a distance equal to the radius of the filter.

9. The method of claim 1 wherein the footprint includes a minor axis, and further comprising the step of determining a number of sample points by:
determining a length of the major axis;
determining a length of the minor axis;
computing a ratio between the lengths of the major axis and the minor axis;
adjusting the ratio by an offset value, the offset value depending on the computed value of the ratio; and
rounding the adjusted ratio to an integer to produce the number of sample points.

10. The method of claim 9 wherein the offset value increases as the computed value of the ratio decreases.

11. The method of claim 1, further comprising the steps of:
determining two vectors that tangentially bound and uniquely determine the footprint;
determining the shorter and the longer of the two vectors;
scaling the longer vector by a first scale factor;
rotating a copy of the longer vector by 90 degrees;
scaling the rotated copy of the longer vector by a second scale factor; and
adding the scaled longer vector to the rotated and scaled copy of the longer vector to determine the major axis of the footprint.

12. The method of claim 11, further comprising the steps of:
computing a ratio between the lengths of the two vectors;
determining a value that represents the angle between the two vectors;
accessing a look-up table using the ratio and the value that represents the angle as indices to retrieve data about the elliptical footprint for computing a stepping vector.

13. The method of claim 11, wherein the copy of the longer vector is rotated counterclockwise when the shorter vector is on a counterclockwise side of the longer vector and rotated clockwise when the shorter vector is on a clockwise side of the longer vector.

14. The method of claim 12, wherein the value that represents the angle between the two vectors is the smaller of the tangent and the cotangent of the angle.

15. The method of claim 1, further comprising the step of:
applying a weight to each texture value to produce weighted texture values that are to be combined to produce the final texture value for modifying the pixel.

16. The method of claim 15, wherein the weight applied to a given one of the texture values is determined by a filter function.

17. The method of claim 15, further comprising the step of:
storing the weights in a look-up table that is indexed by a number of sample points to be sampled on the line.

18. The method of claim 15, further comprising the step of:
storing the weights in a look-up table indexed by a value that is associated with a range of elliptical footprints.

19. A computerized method for applying texture data representing a texture image to an object when rendering the object on a display device, the texture image being stored at varying levels of detail in a set of texture maps, each texture map being associated with one of the levels of detail, the method comprising the steps of:
projecting a circular pixel filter onto one of the texture maps to define an elliptical footprint covering texture data in that texture map, the elliptical footprint having a major axis and a minor axis;
determining sample points on a line in the elliptical footprint, the line closely approximating the major axis of the elliptical footprint;
determining a level of detail at which to sample texture data based on a length of the minor axis of the elliptical footprint;
selecting two texture maps from which to sample texture data at each sample point based on the level of detail;
sampling texture data at sample locations in each selected texture map that correspond to the sample points on the line in the elliptical footprint to determine a texture value for each sample location;

combining the texture values of corresponding sample locations in the selected texture maps to produce a sample value for each sample point on the line in the elliptical footprint;

applying a weight to each sample value to produce weighted sample values, a sum of the applied weights equaling a value of one; and summing the weighted sample values to produce a final texture value for modifying the pixel.

20. The method of claim 19, further comprising the step of:

determining a new level of detail for each sample point; and wherein the step of selecting two texture maps from which to sample texture data at each sample point is based on the new level of detail for that sample point.

21. A computer system for applying texture data representing a texture image to an object when rendering the object on a display device, comprising:

memory storing the texture image at varying levels of detail in a set of texture maps, each texture map being associated with one of the levels of detail;

means for projecting a pixel onto one of the texture maps to define an elliptical footprint covering texture data in that texture map, the footprint having a major axis;

means for determining sample points on a line in the footprint, the line closely approximating the major axis of the elliptical footprint;

means for determining a level of detail for the center of the elliptical footprint;

means for selecting at least one texture map from which to sample texture data at each sample point based on the level of detail; and means for sampling texture data at the sample points to determine a texture value for each sample point, each texture value contributing to a final texture value for the modifying the pixel.

22. The system of claim 21, wherein the footprint includes a minor axis having a length, and further comprising:

means for determining the length of the minor axis; and
means for determining a level of detail at which to sample texture data based on the length of the minor axis.

23. The system of claim 22, wherein the means for determining a level of detail determines a new level of detail for each sample point.

24. The system of claim 22, further comprising:

means for increasing the length of the minor axis of the footprint when texture data would be excluded from sampling at the determined level of detail.

25. The system of claim 21, further comprising:

means for applying a weight to each texture value to produce weighted texture values that are to be combined to produce the final texture value for modifying the pixel.

26. The system of claim 25, further comprising:

a look-up table storing the weights, the table being indexed by a number of sample points to be sampled on the line.

27. The system of claim 25, further comprising:

a look-up table storing the weights, the table being indexed by a value that is associated with a range of elliptical footprints.

28. A computerized method for applying texture data representing a texture image to an object when rendering the object on a display device, the texture image being stored at varying levels of detail in a set of texture maps, each texture map being associated with one of the levels of detail, comprising the steps of:

projecting a pixel onto one of the texture maps to define an elliptical footprint covering texture data in that texture map;

determining two vectors that tangentially bound and uniquely determine the footprint;

determining the shorter and the longer of the two vectors;
scaling the long vector by a first scale factor;
rotating a copy of the longer vector by ninety degrees;
scaling the rotated copy of the longer vector by a second scale factor; and adding the scaled longer vector to the rotated and scaled copy of the longer vector to determine the major axis of the footprint;

determining sample points on a line in the footprint, the line closely approximating the major axis; and sampling texture data at the sample points to determine a texture value for each sample point, each texture value contributing to a final texture value for modifying the pixel.

29. The method of claim 28, further comprising the steps of:

computing a ratio between the lengths of the two vectors;
determining a value that represents the angle between the two vectors; and accessing a look-up table using the ratio and the value that represents the angle as indices to retrieve data bout the elliptical footprint for computing a stepping vector.

30. The method of claim 28, wherein the copy of the longer vector is rotated counterclockwise when the shorter vector is on a counterclockwise side of the longer vector and rotted clockwise when the shorter vector is on a clockwise side of the longer vector.

31. The method of claim 29, wherein the value that represents the angle between the two vectors is the smaller of the tangent and the cotangent of the angle.

32. The method of claim 28, further comprising the step of:

applying a weight to each texture value to produce weighted texture values that are to be combined to produce the final texture value for modifying the pixel.

33. The method of claim 32, wherein the weight applied to a given one of the texture values is determined by a filter function.

34. The method of claim 32, further comprising the step of:

storing the weights in a look-up table that is indexed by a number of sample points to be stamped on the line.

35. The method of claim 32, further comprising the step of:

storing the weights in a look-up table indexed by a value that is associated with a range of elliptical footprints.

* * * * *

UNITED STATES PATENT AND TRADEMARK OFFICE
CERTIFICATE OF CORRECTION

PATENT NO.   : 6,292,193 B1
DATED        : September 18, 2001
INVENTOR(S)  : Perry et al.

It is certified that error appears in the above-identified patent and that said Letters Patent is hereby corrected as shown below:

Column 7,
Line 32, reads "alfine projection of the circular pixel filter 200 into the" it should read
-- affine projection of the circular pixel filter 200 into the --

Column 21,
Line 36, reads "texture value contributing to a final texture value for the" it should read
-- texture value contributing to a final texture value for --

Column 22,
Line 35, reads "represents the angle as indices to retrieve data bout the" should read
-- represents the angle as indices to retrieve data about the --
Line 41, reads "rotted clockwise when the shorter vector is on clockwise" should read
-- rotated clockwise when the shorter vector is on a clockwise --

Signed and Sealed this

Thirtieth Day of April, 2002

*Attest:*

*Attesting Officer*

JAMES E. ROGAN
*Director of the United States Patent and Trademark Office*